United States Patent [19]

Crisan

[11] Patent Number: 5,751,950
[45] Date of Patent: May 12, 1998

[54] SECURE POWER SUPPLY FOR PROTECTING THE SHUTDOWN OF A COMPUTER SYSTEM

[75] Inventor: Adrian Crisan, Houston, Tex.

[73] Assignee: Compaq Computer Corporation, Houston, Tex.

[21] Appl. No.: 632,892

[22] Filed: Apr. 16, 1996

[51] Int. Cl.$^6$ .................................................. G06F 11/00
[52] U.S. Cl. ............................... 395/188.01; 395/182.22; 395/750.02
[58] Field of Search .............................. 395/188.01, 186, 395/187.01, 750, 742, 733, 182.21, 182.22, 750.01, 750.02

[56] References Cited

U.S. PATENT DOCUMENTS

| 4,604,708 | 8/1986 | Lewis | 395/188.01 |
|---|---|---|---|
| 4,868,832 | 9/1989 | Marrington et al. | 395/182.22 |
| 5,056,092 | 10/1991 | Bruner | 395/182.22 |
| 5,230,055 | 7/1993 | Katz et al. | 395/182.22 |
| 5,276,865 | 1/1994 | Thorpe | 395/182.22 |
| 5,317,752 | 5/1994 | Jewett et al. | 395/182.22 |
| 5,355,490 | 10/1994 | Kou | 395/182.22 |
| 5,386,552 | 1/1995 | Garney | 395/182.22 |
| 5,495,531 | 2/1996 | Smiedt | 380/4 |
| 5,535,404 | 7/1996 | Tsubota | 395/182.22 |
| 5,553,292 | 9/1996 | Daly et al. | 395/182.22 |

OTHER PUBLICATIONS

Bergman, "A Password Protected Power Controller", Southern Tier Technical Conference, IEEE, pp. 252–257, 1988.
Smith, "How to Investigate and Prosectute Network Instrusions", Computer Security Journal, vol. 11, No.2 pp. 47–54, 1995.
System Guide—Microsoft Windows NT Workstation, Version 3.5, published by Microsoft Corporation, 1992/1996.
Article from PC Magazine, v15, n1, p. 308(3)(Jan. 9, 1996).

*Primary Examiner*—Robert W. Beausoliel, Jr.
*Assistant Examiner*—Joseph E. Palys
*Attorney, Agent, or Firm*—Pravel, Hewitt, Kimball & Krieger

[57] ABSTRACT

An apparatus is disclosed for protecting a computer system from an unintended or a malicious removal of power by a user. The apparatus has a power supply for supplying power to the computer system, a non-volatile memory to store a shutdown key for authorizing a shutdown of the power supply, and a power supply shutdown circuit connected to the power supply and the non-volatile memory. The power supply shutdown circuit also includes a switch adapted to receive a power supply shutdown input from the user. Upon receipt of the shutdown input, the apparatus displays a dialog box which requests a password from the user. The apparatus compares the password with the shutdown key in the non-volatile memory and proceeds to shut-down the power supply if the shutdown key matches the password entered by the user. Otherwise, the apparatus maintains power to the computer system until a correct password has been entered. The power supply is shut down by either asserting a shutdown input or by breaking the connection between the power supply and the AC line. Since system shutdowns are allowed only after proper authorization and verification, the present invention minimizes the potential for computers to be powered off accidentally or maliciously.

24 Claims, 7 Drawing Sheets

FIG. 10 even more paramount...

SECURE POWER SUPPLY FOR PROTECTING THE SHUTDOWN OF A COMPUTER SYSTEM

BACKGROUND OF THE INVENTION

1. Field of the Invention

The invention relates to a power supply for electronic data processing equipment, and more particularly, to a secure power supply for electronic data processing equipment.

2. Description of the Related Art

Electronic computers increasingly play a central role in many aspects of modern life, both in homes and businesses. These computers range in size from large mainframes which process enormous amounts of data to ubiquitous personal computers such as International Business Machines (IBM) compatible personal computers. These electronic computers require electrical power from an alternating current (AC) power outlet or line. Unlike most appliances and machines powered by electricity where improper shutdowns do not result in any permanent loss or damage to the machine, electronic computers behave poorly when confronted with sudden and unexpected power losses.

In a typical computer operation, data files in a disk drive are opened before they are accessed and retrieved into the computer's memory. The data is processed by a central processing unit, and the results are written back to the memory or the disk drive. The data files contain data or operating instructions which are subject to being lost if power is removed from the computer system without first closing the data files.

In the computer, instructions and data in the form of key strokes may also be entered into the computer through a keyboard. If the data or key strokes should become lost during the power loss, or if there is some alteration of the software operating environment as a result of the power loss, it may be difficult or impossible to recover or reconstruct the information later. For instance, if the removal of power occurs during the installation of the operating system or the formatting of the disk drive, the system will be rendered inoperative. Further, certain alterations caused by improper shutdowns are quite subtle in nature and result in more serious problems because the computer user may obtain erroneous results without warnings and clues as to their cause.

In addition to accidental shutdowns caused by authorized personnel, computer equipment also face the risk of malicious shutdowns by unauthorized personnel. For example, a malevolent individual can shut down the computer equipment without notifying the proper controlling authorities. The malevolent individual can also move or remove the computer equipment without notifying the proper controlling authorities after shutting down the equipment. These malevolent acts could deprive the proper owner of the computer assets and the use of such computer assets. Due to the potential for network server computers to be powered off accidentally or maliciously, it is important that power be removed and the system be shutdown only after proper verification.

The need for controlling the powerdown of the computer system becomes even more paramount in computers with advanced operating systems such as Windows 95™ and Windows NT™, available from Microsoft Corp. located in Redmond, Wash. These operating systems require the user to shut down the operating system via specific software steps rather than simply turning off the power switch. For example, in Windows 95™, the user should click a Start button and select the Shut Down item from the Start menu. The selection of the Shut Down item causes a dialog box to appear on the screen, giving the user the options of shutting down completely, restarting the PC, or exiting to the disk operating system (DOS).

In these advanced operating systems, the shutdown procedure is needed because numerous pieces of status information and configuration data residing in a Windows registry file are not updated until the system has been properly shutdown. Further, data stored in the disk cache are not flushed to disk until the user properly exits Windows 95™ or Windows NT™. Thus, the removal of power without following the proper shutdown procedure can corrupt the Windows registry file and compromise the overall reliability of the computer during subsequent operations.

Personal computers also constitute important tools at home for entertainment, education, or work-related purposes. However, in the home environment, children can accidentally turn off power to the system because they don't realize the significance of toggling the power supply on/off switch. Further, non-technical users may accidentally turn off their computers before they have properly saved their work. Although the results of unintentional shutdowns are not as drastic or severe as those in a business environment, an improper removal of power causes the same problems for home computers. Thus, the removal of power from a home computer system should be taken only after proper authorization to prevent problems caused by accidental or malicious computer shutdowns.

SUMMARY OF THE INVENTION

An apparatus is disclosed for protecting a computer system from an unintended or a malicious removal of power by a user. The apparatus has a power supply for supplying power to the computer system, a non-volatile memory to store a shutdown key for authorizing a shutdown of the power supply, and a power supply shutdown circuit connected to the power supply and the non-volatile memory. The power supply shutdown circuit also includes a switch adapted to receive a power supply shutdown input from the user.

Upon receipt of the shutdown input, the apparatus displays a dialog box which requests a password from the user. The apparatus compares the password with the shutdown key in the non-volatile memory and proceeds to shut-down the power supply if the shutdown key matches the password entered by the user. Otherwise, the apparatus maintains power to the computer system until a correct password has been entered. The power supply is shut down by either asserting a shutdown input or by breaking the connection between the power supply and the AC line.

Since system shutdowns are allowed only after proper authorization and verification, the present invention minimizes the potential for computers to be powered off accidentally or maliciously.

The present invention also protects systems employing advanced operating systems such as Windows 95™ or Windows NT™. In such environments, the apparatus ensures that the shutdown procedure is followed. Thus, the status and configuration information are properly written to the Windows registry file and data stored in the disk cache are flushed to disk and opened data files are closed. As the power supply is turned off only after proper authorization and verification, the potential damage caused by accidental or malicious shutdowns of the computer system is prevented.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
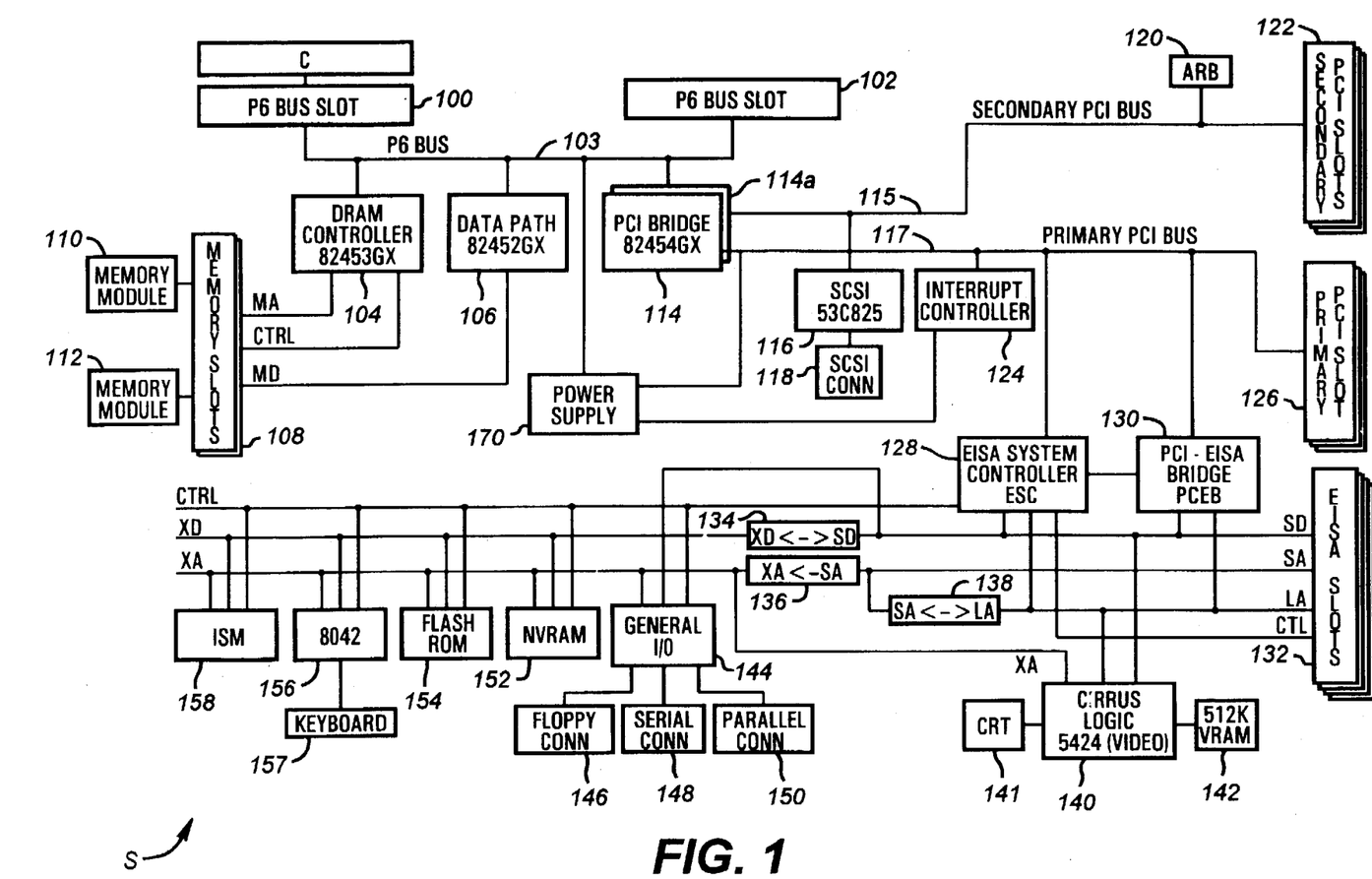
FIG. 1 is a schematic block diagram of a computer system having a secure power supply in accordance with the present invention.

Turning to FIG. 1, a server computer system S which is powered by the secure power supply of the present invention is disclosed. To provide sufficient processing capability for enterprise-class server applications, the server computer system S of FIG. 1 deploys one or more processors, preferably the Pentium Pro™ processor available from Intel Corporation located in Santa Clara, Calif. The Pentium Pro™ processors reside on a processor card C which is plugged into one of the P6 slots 100–102. The P6 slots 100–102 are connected to a 72-pin Pentium Pro™ host bus called the P6 bus 103. The P6 bus 103 is a high performance bus which preferably supports two processor cards mounted on slots 100–102. Preferably, each processor card C supports two Pentium Pro™ processors. Thus, the preferred embodiment supports up to four processors.

In addition to the processors, the P6 bus 103 is connected to a memory controller 104 and a data path device 106 which collectively form a DRAM control subsystem. Preferably, the DRAM controller is an 82453GX and the data path device 106 is an 82452GX, both of which are available from Intel Corporation.

The DRAM controller 104 provides control and timing to the memory subsystem, while the data path device 106 interfaces the 72-bit P6 host bus to the memory array. The memory controller 104 and the data path 106 are capable of taking a memory request from the CPU, queuing it, and responding after the requested operation has completed. Additionally, the controller 104 provides memory error correction which is vital in server applications, including the capability of single-bit error correction and multi-bit error detection on the fly. The memory controller 104 can handle up to four gigabytes of page mode DRAM. Memory arrangements having non-interleaved, x2 and x4 interleaving configurations are supported by the memory control sub-system.

A plurality of memory modules 110–112 are connected to memory slots 108 to provide up to four gigabytes of memory. During operation, the actual performance of the memory subsystem will depend in part on the mix of read and write operations and the memory access patterns for a given application. The controller 104 minimizes the impact of the idle cycles by allowing read operations to bypass around the write operations and be completed first as long as the memory addresses for the read/write pair do not match.

In addition to the memory controllers, a robust input/output system is needed for the server S. The I/O subsystem designed for the server must be scalable while meeting the performance requirements for the four Pentium Pro™ processors. The PCI bus provides a combination of high performance and scalable I/O for the demanding environment faced in server applications. To provide PCI connections, one or more PCI bridges 114 are connected to the P6 bus 103. The peer-to-peer arrangement of the PCI bus eliminates one or more levels of arbitration present in the hierarchical arrangement, resulting in higher system performance.

Preferably, the PCI bridge 114 is an 82454GX PCI bridge (PB) from Intel which integrates the bus arbitration logic required to connect up to two 82454GX PB components without any external glue logic. In the preferred embodiment, one PCI bridge is configured to be the compatibility PCI bridge by strapping options at power-up. This PCI bridge provides the PC compatible path to the boot ROM and the EISA/ISA bus.

A second PCI bridge 114a, called an auxiliary bridge, is configured by strapping options to be the auxiliary PCI bridge. The auxiliary bridge 114a controls a secondary PCI bus 115 and also has an arbiter 120 which arbitrates accesses to the host after the compatibility bridge 114 has been serviced. Additionally, a system that requires more than two 82454GX PBs must provide an external arbiter.

Normally, the arbitration for the processor bus is controlled by the compatibility bridge, which will have a higher priority than the auxiliary bridge to ensure a proper response time for ISA bus masters. The plurality of PCI bridges 114 provides a plurality of PCI buses. Because the plurality of PCI bridges 114 and 114a are directly connected to the P6 bus 103, they provide inherently faster arbitration response than the alternative of cascading PCI bridges together to provide for multiple PCI buses. This ability not only provides for design flexibility, but also for redundant I/O channels for systems in which reliability is paramount.

As in the DRAM controller 104, the PCI bridge 114 supports a full 64-bit interface to the CPU bus, including support for all protocols as well as error correction. The PCI bridge 114 supports an 8-deep transaction in-order queue as well as separate 4-deep queues for both outbound (processor to PCI) and inbound (PCI to processor) transactions that are for the I/O bus agent. Also, like the DRAM controller 104, the PCI bridge 114 provides four 32-byte data buffers in both the inbound and outbound directions. The buffers decouple the host bus 103 from the PCI buses 115–117 and optimize performance by allowing the posting of data at full bus speeds in both directions.

However, unlike the DRAM controller 104, the PCI bridge 114 supports up to two outstanding deferred-reply requests. This feature allows a bus transaction to be split and completed later, preventing the Pentium Pro™ P6 bus 103 from becoming blocked by long latency I/O operations. In this mode, the PCI bridge 114 would defer Pentium Pro™ memory reads, I/O reads, I/O writes, and interrupt acknowledge transactions. However, memory write transactions are not deferred since they are better optimized through posting.

Attached to the secondary PCI bus 115 is a SCSI disk controller 116. The SCSI controller 116 provides the capability of handling simultaneous disk commands, as is necessary in a multi-threaded, multi-tasking operating system. Preferably, the SCSI controller 116 is a 53C825 available from NCR Corporation. Attached to the 53C825 is one or more SCSI connectors 118 which drives a plurality of disk drives adapted to support the host system's simultaneous issuance of multiple commands to one or more SCSI devices. The ability to overlap commands and queue the commands to one or more devices can significantly boost performance in environments such as Windows 95™ or Windows NT™. In addition to the SCSI controller 116, a plurality of devices may be plugged into the secondary PCI bus 115 over a plurality of secondary PCI slots 122.

On the primary PCI bus 117, an interrupt controller 124 handles interrupt requests coming into the PCI bridge 114 for eventual transmission to one of the processors in slots 100–102. The interrupt controller 124 routes interrupt requests from devices located on PCI buses 115–117 to the processors on slots 100–102 during multiprocessor operation. Additionally, a number of PCI peripherals may be plugged into a plurality of primary PCI slots 126.

An EISA system controller (ESC) 128, preferably the Intel 82374EB device, and a PCI-EISA bridge (PCEB) 130, preferably the Intel 82375EB, are also connected to the primary PCI bus 117. The ESC 128 and the PCEB 130 must be connected to the primary PCI bus 117, as the auxiliary bus controller must request arbitration from the compatibility bus controller 114 on some operations. That added latency means that the auxiliary bus or secondary PCI bus 115 cannot meet PCI version 2.1 latency specifications, and that EISA and ISA bus bridges have to be on the compatibility bus or primary PCI bus 117.

The ESC 128 and the PCEB 130 work in tandem to provide an EISA I/O subsystem interface for the computer system S. The combination of the ESC 128 and the PCEB 130 provides an I/O subsystem capable of taking advantage of the power of the PCI bus architecture while maintaining access to a large base of EISA and ISA expansion cards, and the corresponding software applications.

With the inclusion of the ESC 128 and the PCEB 130, the system S now contains three levels of buses structured in the following hierarchy: P6 bus 103 as the execution bus; an expansion bus system having a primary and secondary PCI bus 115–117; and EISA bus as a secondary I/O bus. This bus hierarchy allows concurrency for simultaneous operation on all three bus environments. Data buffering permits concurrency for operations that cross over into another bus environment.

The ESC 128 implements system functions such as timer/counter, DMA, interrupt controller, and EISA subsystem control functions such as EISA bus controller and EISA bus arbiter. The PCEB 130 provides the interface to the bridge between the PCI and EISA buses by translating bus protocols in both directions. It uses extensive buffering on both the PCI and EISA interfaces to allow concurrent bus operations.

The ESC 128 and the PCEB 130 are connected to a plurality of EISA slots 132. Additionally, the ESC 128 also generates chip selects for certain functions that typically reside on an X bus. The ESC 128 generates chip select signals from an integrated system management unit (ISM) 158, a keyboard controller 156, a flash ROM 154, a non-volatile RAM 152, and a general purpose I/O device 144. The I/O device 144 supports floppy drives, serial ports, and parallel ports over floppy connectors 146, serial connectors 148, and parallel connectors 150. The keyboard controller 156 is connected to a keyboard 157 for receiving data entry from the user.

The EISA slots 132 have system data lines connected to the data bus of the X bus via a buffer 134 which provides accesses to I/O devices as well as the system BIOS in the flash ROM 154. Further, the EISA slots 132 have system address lines that are connected to the address lines of the X bus via buffer 136. The EISA slots 132 have latched address lines which are connected to the system address lines via buffer 138. Finally, a video controller 140 is connected to the X bus address lines, the EISA/132 system data lines, and the latched address lines. Preferably, the video controller is a Cirrus Logic 5424 controller. The video controller 140 is connected to a video RAM 142 which is preferably 512 kilobytes in size. The output of the video controller 140 is provided to a display CRT 141 for visually communicating data to the user.

Figure 2:
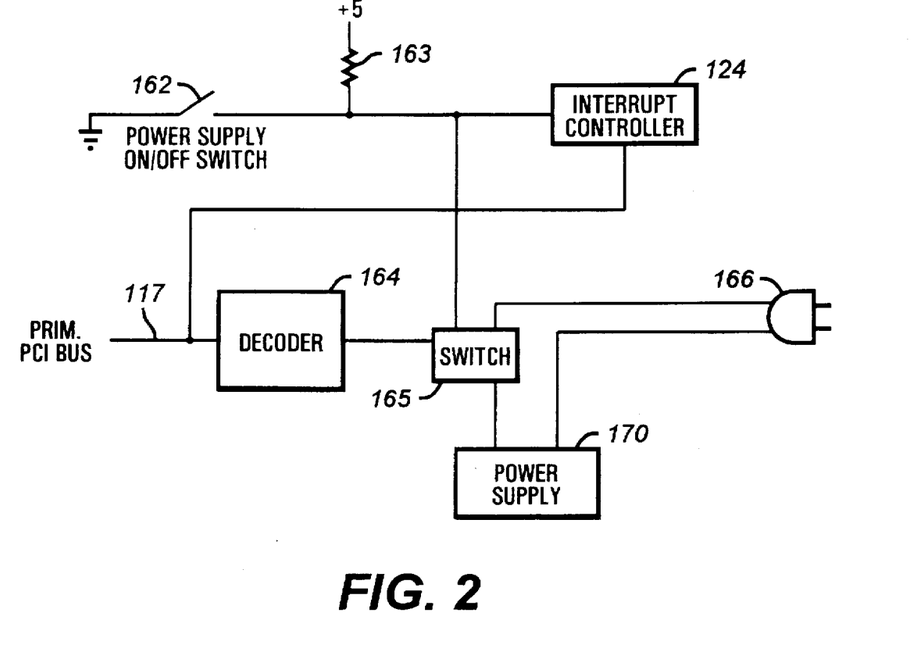
FIG. 2 is a schematic block diagram of a first embodiment of a security circuit associated with the power supply of the computer system of FIG. 1.

In the system S of FIG. 1, all electronic devices discussed above, including the processors, are powered by a regulated power supply 170, as shown in FIGS. 1–4. The regulated power supply 170 (FIG. 2) has a security control interface circuitry connected to the primary PCI bus 117 (FIGS. 1 and 2). The security interface of regulated power supply 170 also generates an interrupt signal directed at the interrupt controller 124, which is described in more detail in FIG. 4. The power supply 170 is shut-down by the present invention only after the user enters a valid password to prevent the accidental or mischievous removal of power from the computer system S, as described shortly below.

Turning now to FIG. 2, the apparatus for securing the power supply 170 is shown in more detail. In FIG. 2, the interrupt controller 124 receives an input from a power supply on/off switch 162. One end of the on/off switch 162 is connected to ground, while the other end of the on/off switch 162 is connected to a pull-up resistor 163. The output of the on/off switch is connected to the interrupt controller 124, whose outputs are placed onto the primary PCI bus 117 (FIG. 1) for transmission to the processor over the PCI bridge 114.

Upon receipt of the interrupt request generated by the on/off switch 162, the processor on card C jumps to an interrupt service routine which will be discussed below. The interrupt service routine transmits a shutdown command to a decoder 164 (FIG. 2) over the primary PCI bus 117. The decoder 164 detects whether or not a power supply turn-off command has been authorized by the computer system S.

Upon detecting that the computer system S has issued a shutdown command, the decoder 164 in turn causes a switch 165 to break the connection between the alternating current (AC) line input of the power supply 170. The power supply 170 receives its AC voltage supply via an AC plug 166. A first end of the AC plug 166 is connected to one end of the switch 165, while a second end of the plug 166 is connected to the second AC input of the power supply 170. The switch 165 is connected to the first AC input of the power supply 170.

The switch 165 is connected to the output of the power supply on/off switch 162 so that the connection between the plug 166 and the power supply 170 is restored when the user moves the on/off switch 162 to turn on the computer system S from a power-down condition. Thus, the switch 165 normally provides an electrical connection for the AC voltage from the plug 166 to the power supply 170. The decoder 164, upon receipt of a shutdown instruction sent by the processor in response to the interrupt signal from the interrupt controller 124, passes the shutdown instruction in the form of an actuation signal to the switch 165. The assertion of the actuation signal causes the switch 165, which could be electronic or electro-mechanical, including power FETs, relays or solid state relays, to be actuated so as to break or to complete the electrical connection between the plug 166 and the power supply 170. Thus, upon receipt of the shutdown command by the processor after someone toggles the power supply on/off switch 162 and after the proper password has been entered, the switch 165 disables the power supply 170 so that the system can be safely powered down.

Figure 3:
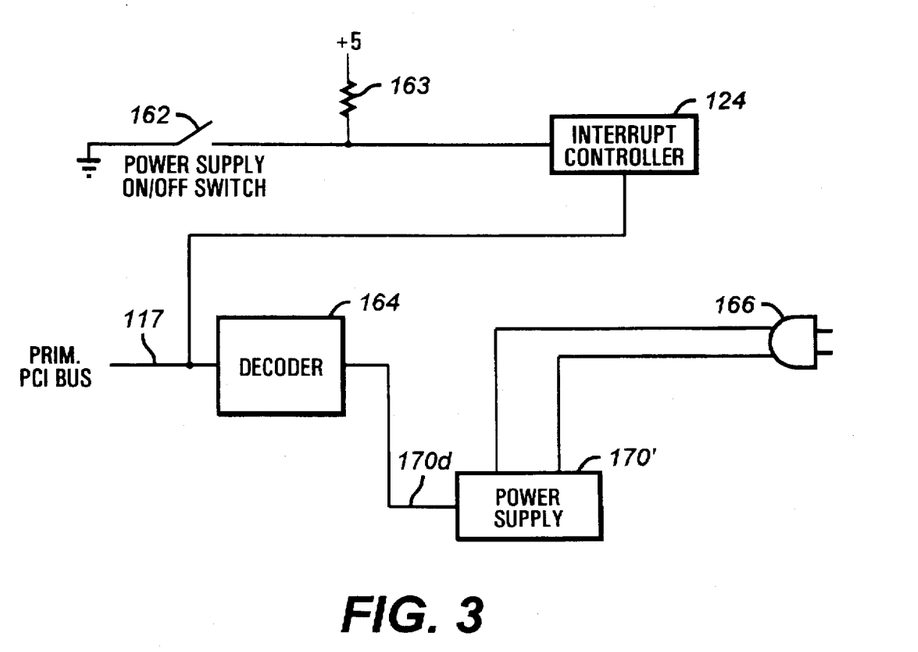
FIG. 3 is a schematic block diagram of a second embodiment of the security circuit associated with the power supply of the computer system of FIG. 1.

FIG. 3 shows a second embodiment of the secure power supply of the present invention. Components in FIG. 3 which performs in a like manner to components in FIG. 2 bear the same reference numerals to those shown in FIG. 2. In FIG. 3, the power supply 170' has a shutdown input 170d directly connected to the decoder 164. Thus, a switch such as the switch 165 of FIG. 2 is not needed in FIG. 3, and the power supply 170' is directly connected to the AC line via the AC plug 166. The shutdown input 170d is connected to the decoder 164 so that upon detection of the shutdown command by the computer system S, the shutdown input 170d is asserted to disable the power supply 170'.

The circuitry of the regulated power supply 170' with the shutdown input 170d (FIG. 4) includes, as is conventional, a power converter 450 for converting an AC voltage to one or more DC voltages. The power converter 450 preferably has a pair of input power terminals connected to a single-phase AC input power source via the plug 166. As is well-known in the art, the AC terminals are coupled across a bridge rectifier arrangement which develops a high DC voltage across a filter capacitor. This high DC voltage is connected to the input of a power supply controller 452 that includes a pulse width modulator (PWM) for converting the high DC input voltage to a low DC output voltage. The output of the power converter 450 is also connected to a power supply supervisory circuit 454 which generates various output signals indicating the state of the power supply 170d', including a POWERGOOD signal. The power supply supervisory circuit 454 also receives the shutdown signal input SHUTDOWN 170d to disable the power supply 170'. As has been disclosed, the SHUTDOWN input is asserted only when a valid password has been entered in response to the toggling of the power supply on/off switch 162.

Figure 4:
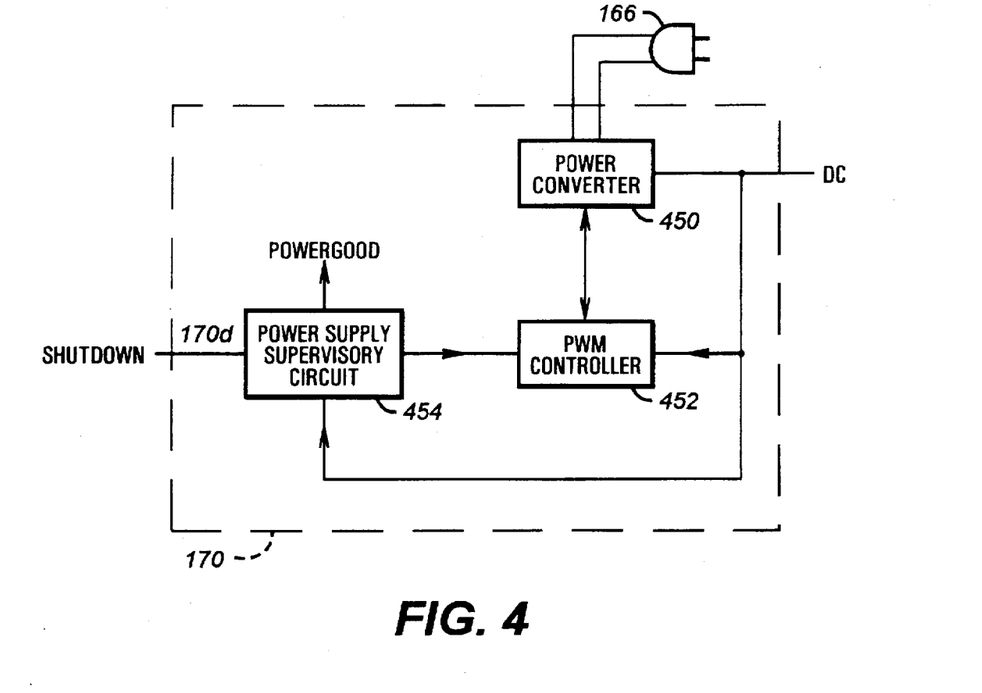
FIG. 4 is a block diagram of the power supply of the computer system of FIG. 1.

The PWM controller 452 operates as a fixed frequency current mode controller where the duty cycle is set by the input/output voltage ratio. The PWM controller 452 has an enable/disable input signal, driven by SHUTDOWN from supervisory circuit 454. Thus, the pulse width modulator 452 can be disabled to shutdown the power supply after someone toggles the power supply on/off switch 162 and after the proper password has been entered.

Although it is apparent that the central processing unit (CPU) can periodically poll the power supply on-off switch 162 to sense shutdown requests, the present invention contemplates the use of an interrupt approach. The interrupt approach is more efficient because it allows the processor to execute its main program and to service peripheral devices such as the on-off switch 162 only when requested by the device itself. In the preferred embodiment of the present invention, the closure of the power supply on/off switch 162 generates an interrupt signal to the interrupt controller 124 to cause the interrupt controller 124 to handle the request via an interrupt service routine, as will be described below.

The programmable interrupt controller (PIC) 124 coupled to the system bus functions as an overall manager in accepting interrupt requests from the I/O devices. The interrupt controller 124 receives interrupts at selected, assigned inputs from devices located on the expansion bus as well as within the enclosure, including the interrupt signal from the power supply on/off switch 162.

On receipt of the interrupt signal such as the signal from the power supply on/off switch 162, the interrupt controller 124 pulses the interrupt input of the processor. The processor completes the currently executing instruction, issues an interrupt acknowledge signal to the PIC 124 and then executes a service routine to service the requesting device. Once the interrupt has been serviced, the processor writes an End-of-Interrupt (EOI) input/output (I/O) command to the interrupt controller and continues processing where it left off. The EOI command is typically sent through an I/O instruction to a register within the interrupt controller 124.

Figure 5:
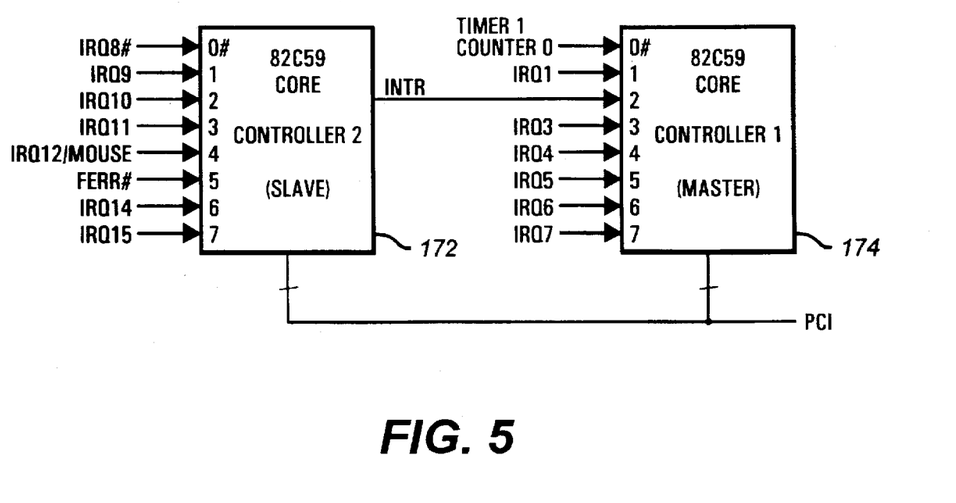
FIG. 5 is a schematic diagram of the interrupt controller of the computer system of FIG. 1.

FIG. 5 illustrates in more detail the interrupt controller 124. The interrupt controller 124 preferably includes two 8259 compatible controllers 172 and 174 from Intel Corporation. These controllers are connected in a cascaded mode to receive sixteen interrupt signals, one of which comes from the security circuit of the power supply 170. Each 8259 interrupt controller handles up to 8 vectored priority interrupts for the processor in card C, and each 8259 interrupt controller has an interrupt output. The 8259 interrupt controller 174 is classified as a master interrupt controller. Traditionally, the master 8259 controller 174 receives interrupt request lines IRQ[7:0]. By connecting the interrupt output of the second 8259 controller 172 to the IRQ2 input of the master interrupt controller, the second interrupt controller becomes the slave interrupt controller which receives interrupt request lines IRQ[15:8].

When one or more of the interrupt request lines IRQ[15:0] are asserted, the interrupt controller 124 determines the priority of the incoming interrupt lines and whether any of the IRQ[15:0] lines need to be masked. If a mask bit corresponding to an interrupt line is set, then the interrupt controller 124 ignores the assertion of the particular interrupt line. If the incoming interrupt line is not masked, the master 8259 controller 174 of the interrupt controller 124 generates the signal to interrupt the processor of the computer system S.

Each of the interrupt controllers 172 and 174 includes an interrupt request register (IRR) and an in-service register (ISR). The IRR is used to store all of the interrupt levels which are requesting service. Thus, the IRR in the master interrupt controller 174 receives the signals IRQ[7:0] and the IRR in the slave interrupt controller 172 receives the signals IRQ[15:8]. The ISR is used to store all of the interrupt levels which are being serviced by the microprocessor. The setting of a bit in the ISR indicates that the particular interrupt request is being serviced. Each of the interrupt controllers 172 and 174 also includes a priority resolver for determining the priorities of the bits in the IRR. In addition, each of the interrupt controllers 172 and 174 also includes an interrupt mask register for storing the bits for masking the interrupt signals IRQ[15:0]. If one or more of the interrupt signals IRQ[15:0] are received as active by the interrupt controllers 172 and 174, the interrupt controllers 172 and 174 respond by determining the priority of the asserted interrupt signals and determining if the mask bit associated with any of the asserted interrupt signals is set. If a mask bit corresponding to an IRQ line is set high, that IRQ line being asserted is ignored.

The 8259 controllers 172 and 174 respond to the assertion of an interrupt acknowledge signal which indicates that the processor is executing an interrupt acknowledge cycle. When the interrupt acknowledge signal is asserted, one of the 8259 controllers 172 and 174 responds by providing the interrupt vector to the PCI bus. If the interrupt controller determines that any one of IRQ[7:0] interrupt signals has been asserted, the master interrupt controller 174 provides the interrupt vector. If it is determined that the one of the IRQ[15:8] signals has the highest priority, then the slave interrupt controller 172 asserts its INTR output, which is connected to the IRQ2 input of the master interrupt controller 174, to indicate to the master interrupt controller 174 that the slave interrupt controller 172 will provide the interrupt vector. The processor next determines the address of the appropriate interrupt service routine from the interrupt vector. The interrupt service routine is then executed. Since the processor of the computer system S needs not poll the on/off switch 162, the detection of the user's request for turning off the computer system S via the on/off switch 162 can be performed using minimal computing resources.

Figure 6:
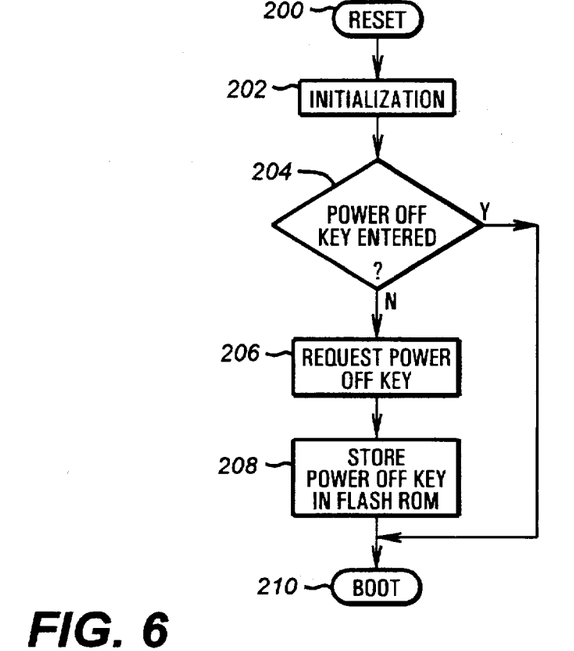
FIG. 6 is a flowchart of the process for initially entering the shutdown key in the present invention.

Turning now to FIGS. 6–9, the flowcharts illustrating the steps under which the computer system S operates to secure the power supply 170 are shown. In FIG. 6, the process for initializing the power off key so that the computer system S is made secure against unauthorized shutdown is shown. Starting at step 200, after the computer system has been started or reset by the application of power or the pulsing of the reset switch on the front panel of the computer system S, the system software is initialized in Step 202. Next, in step 204, the system checks to see if a power-off key or password has been entered. If not, in step 206, the system requests the user to enter a selected password as the power-off key. In step 208, the entered power-off key is stored in the flash ROM 154, or alternatively in the non-volatile RAM 152. From step 208, or from step 204 if the power off key has been entered already, the system S continues its booting process in step 210.

Figure 7:
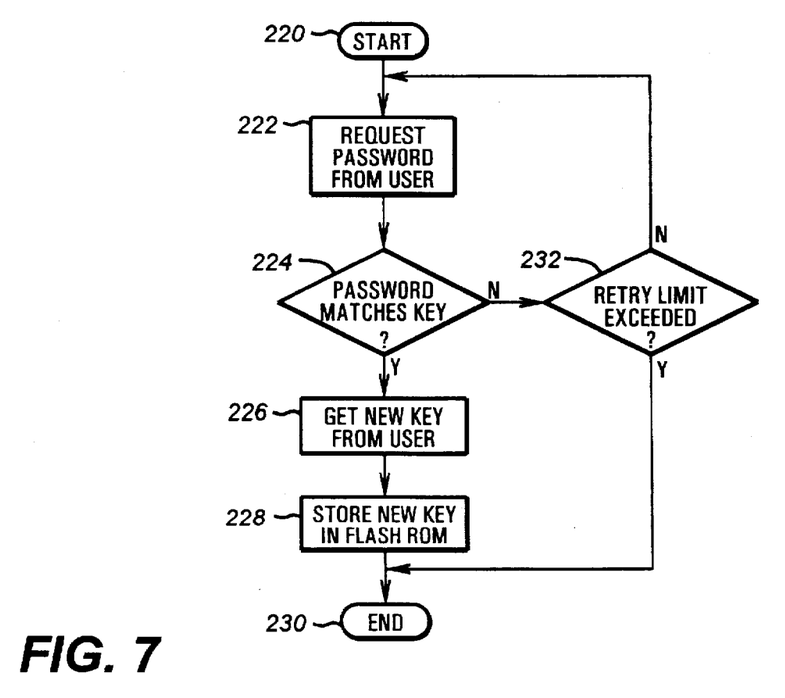
FIG. 7 is a flowchart of the process for changing the shutdown key.

Turning now to FIG. 7, the process illustrating the steps in updating the key to replace an earlier password with a newly selected one is illustrated. From a start at step 220, the system requests the old key or password from the user in step 222. If the password entered by the user matches the key stored in the flash ROM 154 in step 224, the routine requests a new key from the user in step 226. Next, in step 228, the routine stores the new key into memory, such as the flash ROM 154, and exits in step 230.

In the event that the stored key and the entered code do not match in step 224, the routine checks whether the retry limit has been exceeded in step 232. If the retry limit has not been exceeded in step 232, the routine loops back to step 222 to request a different code. Alternatively, in step 232, if the code entered in an attempt at guessing the key exceeds the retry limit, the routine simply exits in step 230 without updating the presently authorized key stored in the flash ROM 154.

Figure 8:
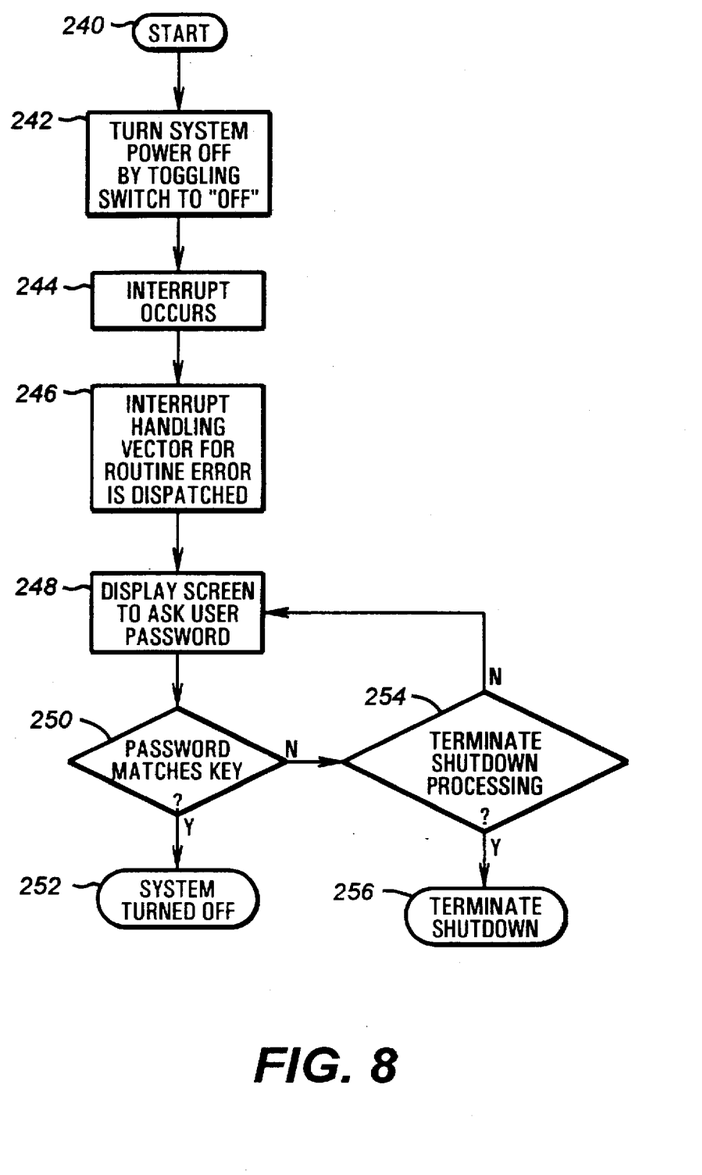
FIG. 8 is a flowchart of the process for securing the power supply without an operating system driver.

Turning now to FIG. 8, the sequence of control of the operation of the secure power supply 170 in the computer system S without an operating system driver is shown. From the start step 240, a shutdown indicated by placing the switch 162 in the off position is detected in step 242. In step 244, an interrupt signal is generated by the switch 162 to the interrupt controller 124. As discussed above, the interrupt controller 124 (FIG. 2) notifies the computer system S of the interrupt request over the primary PCI bus 117. Next, the interrupt handling vector is called and the vector handling routine for shutting down the secure power supply is dispatched in step 246. In step 248, the system displays a screen on the CRT 141 to ask the user to enter the password.

The password validity is checked in step 250. If the user's password matches that of the stored key in the flash ROM 154, the routine proceeds to turn the system off in step 252 by issuing a shutdown command to the decoder 164 which actuates the switch 165. As described above, the power supply 170 is disabled only after receipt of the proper password.

Alternatively, from step 250, if the password does not match the key, the system checks to see if the user has turned the on/off switch 162 to the on position in step 254. If not, the routine displays the screen to ask the user to enter the password once more in step 248. From step 254, if the user has turned the switch 162 back to on, the system shutdown sequence is aborted in step 256. In the event of an unintended or an unauthorized shutdown request, the power supply 170 continues to supply power to the computer system S. Thus, the avoidance of the system shutdown sequence in step 256 protects work in progress by the user(s) from being lost.

Figure 9:
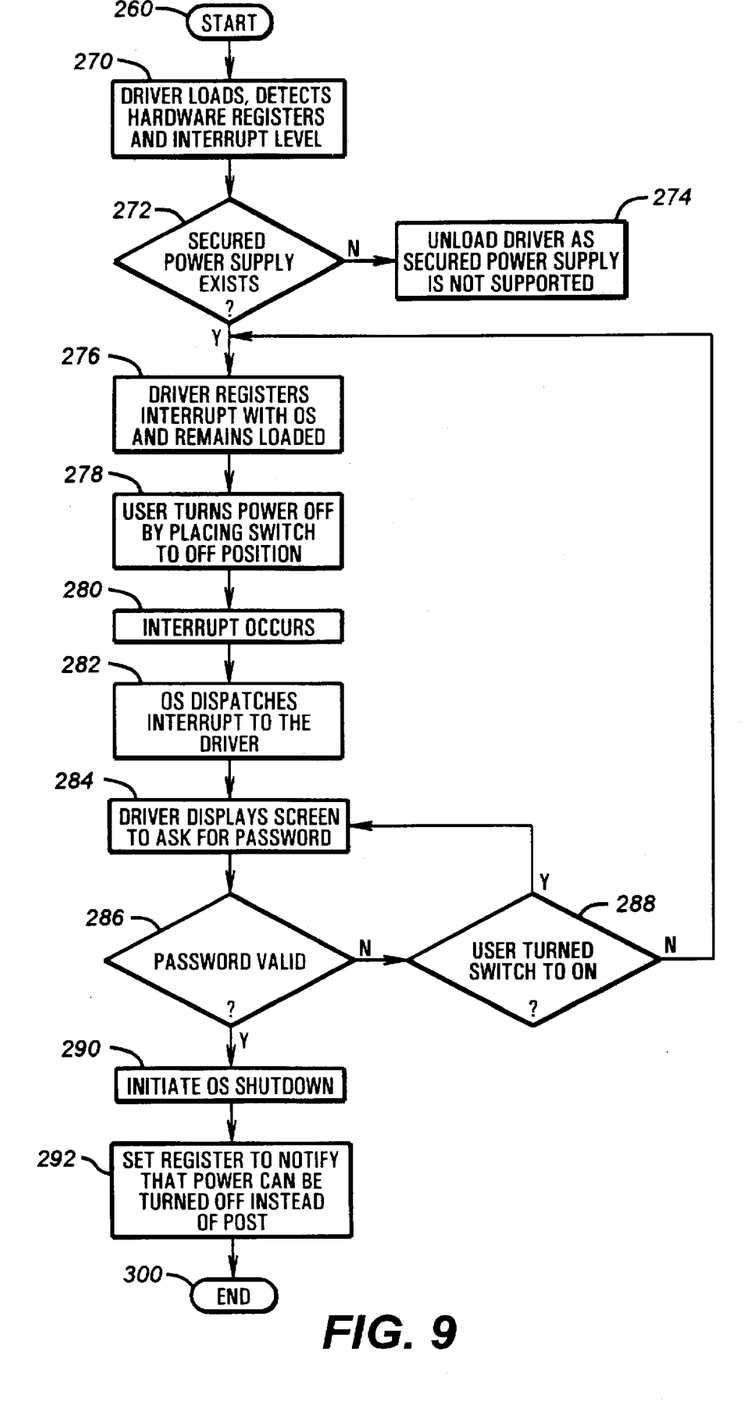
FIG. 9 is a flowchart of the process for securing the power supply with an operating system driver.

Turning now to FIG. 9, the process illustrating the operation of the secure power supply with a Windows 95™ or NT operating system driver is shown. In FIG. 9, starting from step 260, the driver is loaded and the system detects the hardware registers and the interrupt level in step 270. Next, the system checks to see if the secure power supply 170 is installed in step 272. In the event that the secure power supply is not installed, the software unloads the driver, and indicates to the system configuration file, or the Windows registry, that the secure power supply is not available in the particular system S in step 274.

From step 272, if the secure power supply 170 has been installed, the routine registers the interrupt level with the operating system and the driver remains loaded in step 276. When a system-down is desired, the user turns the system power supply off by placing the on/off switch 162 in the off position in step 278. Upon turning off the switch 162, an interrupt is generated in step 280. The detection of the interrupt by the interrupt controller 124, as discussed previously in conjunction with the discussion of FIG. 5, causes the operating system to dispatch the interrupt to the appropriate interrupt service routine in step 282.

From step 282, the interrupt service routine displays a modal dialogue box on the screen to ask for a password in step 284. At this step, normal operation cannot continue until the power switch 162 is turned on again or until the correct password has been entered. From step 284, the routine checks the validity of the password in step 286. If the password matches the key, the routine initiates the operating system shutdown in step 290. This will ensure that the cache is cleared and that the operating system is shut down properly. From step 290, a register is set to indicate that the system that power is to be turned off instead of the initiation of the POST (Power On Self-Test) operations in step 290. From step 290, the system exits in step 300.

In step 286, in the event that the password is invalid, the routine checks to see if the user has turned the switch 162 to "on" in step 288. If the user has not turned the switch on, the routine loops back to step 284 to request a new password from the user. Alternatively, in the event that the user wishes to abort the shutdown sequence, the routine loops back to step 276 and continues processing data as is conventional until the next user request for shutdown.

Figure 10:
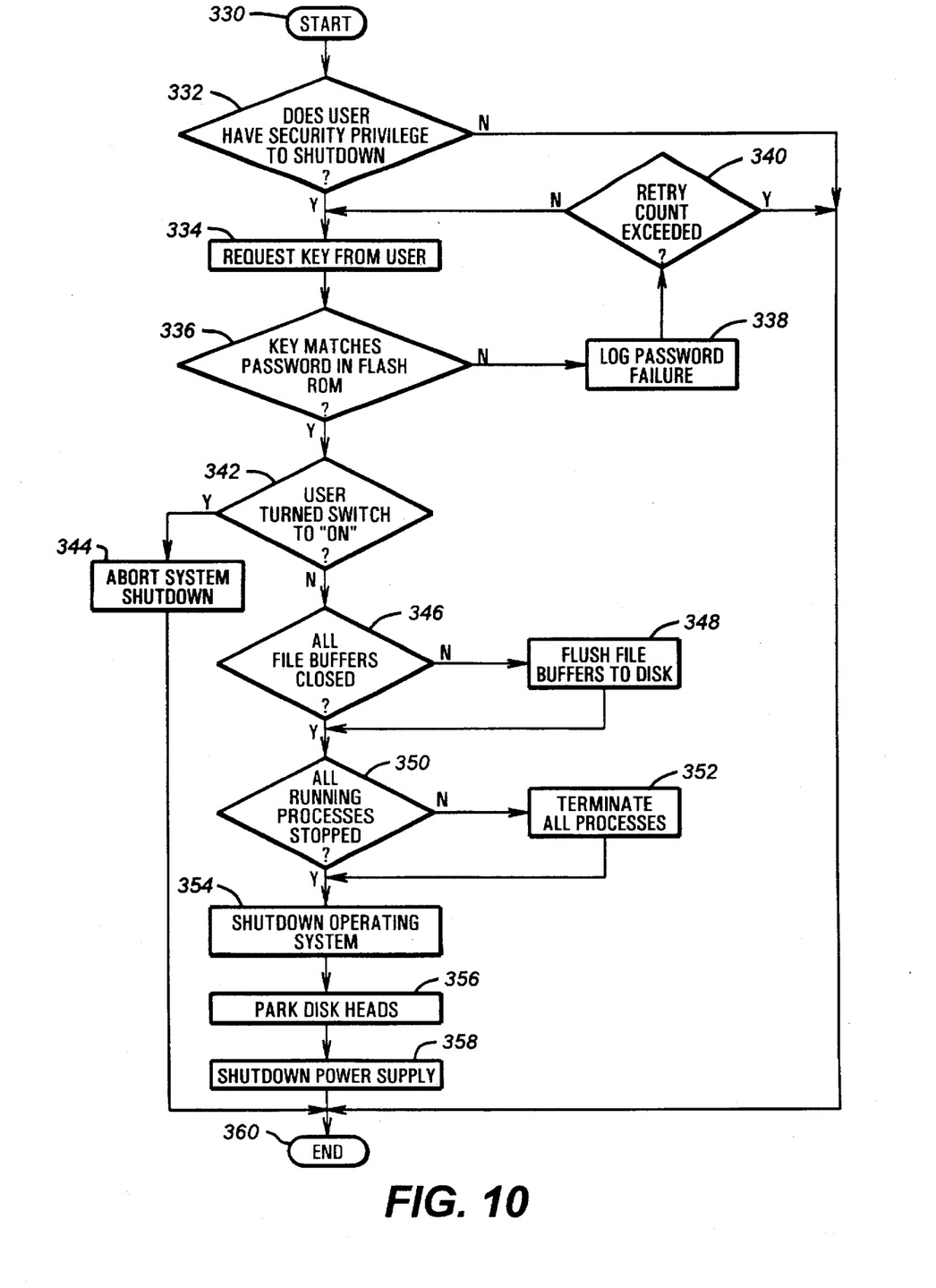
FIG. 10 is a flowchart of an alternate process for securing the power supply with an operating system driver.

Turning now to FIG. 10, a second embodiment of the routine for using the secure power supply with the Windows NT™ or a Windows 95™ operating system is shown. From the start step 330, the routine proceeds to step 332 where the security privilege of the users is checked. In step 332, if the user does not have the appropriate security privilege to issue a system shutdown request, the routine jumps to step 360 to exit the shutdown procedure. Alternatively, in the event that the user does have security privilege, the routine proceeds to step 334 to request a key from the user. In step 336, the password provided by the user is compared against the key stored in the flash ROM 154. If the password does not match the key, the shutdown attempt is logged in step 338 for subsequent user analysis.

From step 338, the routine checks to see if the password retry limit has been exceeded in step 340. In the event that the retry limit has not been exceeded, the routine loops to step 334 to request a new password from the user. Alternatively, from step 340, in the event that the retry limit has been exceeded, the routine exits the shutdown procedure in step 360.

If the key matches the password in step 336, the routine next checks to see if the user has turned the on/off switch 162 back to "on" once more in step 342. If so, the routine proceeds to step 344 where the system shutdown process is aborted before proceeding to step 360 to exit the shutdown procedure. At this point, the routine may perform a number of safety functions (not shown) such as virus detection and clearance or backing up files before shutting down.

Alternatively, from step 342, if the user intends to continue the shutdown process, the routine checks to see if all file buffers have been closed in step 346. If not, the file buffers are flushed to the disks connected to the SCSI connector 118 in step 348. From steps 346 or 348, the routine checks to see if all running processes have been stopped in step 350. If not, the routine terminates all processes in step 352. From step 350 or 352, the routine proceeds to shut down the operating system in step 354. Once this has been done, the routine parks the disks head in step 356 to ensure the safety of the head of the disk drive. Next, the power supply is shut down in step 358 and the process is completed in step 360.

Since system shutdowns are allowed only after proper authorization and verification, the present invention minimizes the potential for network servers as well as home computers to be powered off accidentally or maliciously and thus makes them secure. Further, in Windows 95™ or Windows NT™ environment, the present invention ensures that the shutdown procedure be followed so that the status and configuration information are properly written to the registry file and data stored in the disk cache are flushed to disk prior to the removal of power to protect and make secure the computer system S. Thus, as the power supply is turned off only after proper authorization and verification, the present invention prevents potential damages caused by accidental or malicious shutdowns of the computer system S.

Although the preferred embodiment of the present invention relates to the protection of computers having Windows 3.1™, Windows 95™ or Windows NT™ operating systems, it should be understood that the shut-down protection afforded by the present invention can be used to protect computers running other operating systems as well, including OS/2, Unix and Linux operating systems, among others. Thus, the present invention is not limited to the protection of computers with Windows related operating systems described as the preferred embodiment. Hence, the foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A computer system protected against an unauthorized shutdown by a user, said computer system comprising:
   a processor;
   a memory coupled to said processor;
   a keyboard coupled to said processor for receiving data input from the user;
   a display coupled to said processor for providing visual feedback to the user;
   a data storage drive coupled to said processor for storing data;
   a power supply for supplying power to the computer system;
   a non-volatile memory to store a shutdown key for authorizing a shutdown of said power supply;
   a power supply shutdown circuit coupled to said power supply and said non-volatile memory, said power supply shutdown circuit including:
      a switch adapted to receive a power supply shutdown input from the user;
      an input device for receiving a password from a user upon receipt of said power supply shutdown input from the user;
      a comparator for comparing said password with said shutdown key; and
      a circuit for shutting down said power supply if said comparator indicates that said key matches said password.

2. The computer system of claim 1, wherein said input device further comprises:
   a code for displaying a dialog box on said display, said dialog box prompting the user to enter the password; and
   a code for receiving the password from said keyboard.

3. The computer system of claim 1, wherein said power supply has a pair of alternating current (AC) terminals adapted to couple to an AC line, said circuit for shutting down said power supply further comprising:
   a power switch coupled between a first AC terminal and the AC line, said power switch normally making contact between said first AC terminal and said AC line; and
   a decoder coupled to said power switch, said decoder adapted to cause said power switch to break the contact between said first AC terminal and said AC line upon receipt of a shutdown instruction from said computer system.

4. The computer system of claim 1, wherein said power supply has a shutdown input for disabling said power supply, said circuit for shutting down said power supply further comprising a decoder coupled to said shutdown input, said decoder adapted to assert said shutdown input upon receipt of the shutdown instruction from said computer system.

5. The computer system of claim 1, further comprising a code for updating the shutdown key stored in said non-volatile memory.

6. The computer system of claim 5, further comprising:

a code for checking the presence of a password in the non-volatile memory; and a code for requesting the user to enter a new password in said non-volatile memory if said password is not already present in said non-volatile memory and otherwise, for requesting a key from the user and comparing said password stored said non-volatile memory and said key received from said user, and upon a matching condition, requesting the user to enter the new password in said non-volatile memory.

7. The computer system of claim 1 wherein said non-volatile memory is a flash read-only-memory.

8. The computer system of claim 1, wherein said non-volatile memory is a battery backed-up random-access-memory.

9. The computer system of claim 1, wherein said non-volatile memory further contains system set-up parameters.

10. The computer system of claim 1, further comprising an interrupt controller coupled to said switch and said processor, said interrupt controller causing the processor to execute an interrupt service routine in response to the toggling of said switch to an off position.

11. A method for protecting a secure power supply in a computer system from an inadvertent shutdown, said computer system having a non-volatile memory storing a shutdown password, the method comprising the steps of:

detecting toggle of a switch to turn off power from said computer system;

requesting a key from a user in response to detecting toggle of the switch to turn off power;

comparing said password stored in said non-volatile memory with said key received from said user; and shutting down the power supply only if said password matches said key.

12. The method of claim 11, further comprising the steps of:

checking for the presence of a password in the non-volatile memory;

if said password is not present in said non-volatile memory, requesting the user to enter a new password in said non-volatile memory; and if said password is present in said memory, requesting a key from the user and comparing said password stored in said non-volatile memory and said key received from said user, and when said key matches said password, requesting the user to enter a new key in said non-volatile memory.

13. The method of claim 11, further comprising the step of loading a driver routine in a system interrupt handling table only if the secure power supply is present in the computer system.

14. The method of claim 11, further comprising the step of checking if the user has toggled the switch back to an on-position when the password fails to match the key to abort the shutdown process.

15. An apparatus for protecting a computer system from an unauthorized shutdown by a user, said apparatus comprising:

a power supply for supplying power to the computer system;

a non-volatile memory to store a shutdown key for authorizing a shutdown of said power supply; and a power supply shutdown circuit coupled to said power supply and said non-volatile memory, said power supply shutdown circuit including:

a switch adapted to receive a power supply shutdown input from the user;

an input device for receiving a password from a user upon receipt of said power supply shutdown input from the user;

a comparator for comparing said password with said shutdown key; and a circuit for shutting down said power supply if said comparator indicates that said key matches said password.

16. The apparatus of claim 15, wherein said means for receiving a password further comprises:

a keyboard;

a display;

a code for displaying a dialog box on said display, said dialog box prompting the user to enter the password; and a code for receiving the password from said keyboard.

17. The apparatus of claim 15, wherein said power supply has a pair of alternating current (AC) terminals adapted to couple to an AC line, said circuit for shutting down said power supply further comprising:

a power switch coupled between a first AC terminal and the AC line, said power switch normally making contact between said first AC terminal and said AC line; and a decoder coupled to said power switch, said decoder adapted to cause said power switch to break the contact between said first AC terminal and said AC line upon receipt of the shutdown instruction from said computer system.

18. The apparatus of claim 15, wherein said power supply has a shutdown input for disabling said power supply, said circuit for shutting down said power supply further comprising a decoder coupled to said shutdown input, said decoder adapted to assert said shutdown input upon receipt of a shutdown instruction from said computer system.

19. The apparatus of claim 15, further comprising a code for updating the shutdown key stored in said non-volatile memory.

20. The apparatus of claim 19, further comprising:

a code for checking the presence of a password in the non-volatile memory; and a code for requesting the user to enter a new password in said non-volatile memory if said password is not already present in said non-volatile memory and otherwise, for requesting a key from the user and comparing said password stored said non-volatile memory and said key received from said user, and upon a matching condition, requesting the user to enter the new password in said non-volatile memory.

21. The apparatus of claim 15, wherein said non-volatile memory is a flash read-only-memory.

22. The apparatus of claim 15, wherein said non-volatile memory is a battery backed-up random-access-memory RAM.

23. The apparatus of claim 15, wherein said non-volatile memory further contains system set-up parameters.

24. The apparatus of claim 15, wherein said computer system has a processor adapted to execute an interrupt service routine in response to an interrupt, said apparatus further comprising:

an interrupt controller coupled to said switch and the processor, said interrupt controller causing the processor to execute an interrupt service routine in response to the toggling of said switch to an off position.

* * * * *